(12) United States Patent
Han

(10) Patent No.: US 12,497,304 B2
(45) Date of Patent: *Dec. 16, 2025

(54) PROCESS FOR MAKING A COATED ELECTRODE ACTIVE MATERIAL

(71) Applicant: BASF SE, Ludwigshafen am Rhein (DE)

(72) Inventor: Zhenji Han, Amagaski (JP)

(73) Assignee: BASF SE, Ludwigshafen am Rhein (DE)

( * ) Notice: Subject to any disclaimer, the term of this patent is extended or adjusted under 35 U.S.C. 154(b) by 297 days.

This patent is subject to a terminal disclaimer.

(21) Appl. No.: 18/246,352

(22) PCT Filed: Sep. 16, 2021

(86) PCT No.: PCT/EP2021/075437
§ 371 (c)(1),
(2) Date: Mar. 23, 2023

(87) PCT Pub. No.: WO2022/078701
PCT Pub. Date: Apr. 21, 2022

(65) Prior Publication Data
US 2023/0357051 A1 Nov. 9, 2023

(30) Foreign Application Priority Data
Oct. 16, 2020 (EP) ..................... 20202235

(51) Int. Cl.
| | | |
|---|---|---|
| B05D 1/00 | (2006.01) | |
| C01G 53/50 | (2025.01) | |
| H01M 4/505 | (2010.01) | |
| H01M 4/525 | (2010.01) | |

(52) U.S. Cl.
CPC ............ C01G 53/50 (2013.01); H01M 4/505 (2013.01); H01M 4/525 (2013.01); *C01P 2004/51* (2013.01); *C01P 2004/61* (2013.01); *C01P 2006/40* (2013.01); *C01P 2006/82* (2013.01)

(58) Field of Classification Search
CPC ..... C01G 53/00; C01G 53/42; C01P 2002/52; C01P 2002/54; C01P 2006/12; Y02E 60/10; H01M 4/366
See application file for complete search history.

(56) References Cited

U.S. PATENT DOCUMENTS

| | | |
|---|---|---|
| 8,993,051 B2 | 3/2015 | Kelder et al. |
| 2010/0273057 A1 | 10/2010 | Watanabe et al. |
| 2015/0372300 A1 | 12/2015 | Imaizumi et al. |
| 2019/0393494 A1 | 12/2019 | Kleine et al. |
| 2020/0287213 A1 * | 9/2020 | Ju ....................... H01M 10/052 |

FOREIGN PATENT DOCUMENTS

| | | | |
|---|---|---|---|
| JP | 4789066 B2 | 10/2011 | |
| JP | 513902 B2 | 2/2013 | |
| KR | 20190044536 A * | 4/2019 | ........... C01B 35/121 |
| WO | 2020063680 A1 | 4/2020 | |
| WO | 2020069882 A1 | 4/2020 | |
| WO | 2020069886 A1 | 4/2020 | |

OTHER PUBLICATIONS

International Search Report and Written Opinion for corresponding PCT/EP2021/075437 mailed Dec. 20, 2021; 8 pages.
European Search Report for EP Patent Application No. 20198321.0, Issued on Mar. 22, 2021, 3 pages.
European Search Report for EP Patent Application No. 20202235.6, Issued on Mar. 12, 2021, 3 pages.

* cited by examiner

*Primary Examiner* — Hai Y Zhang
(74) *Attorney, Agent, or Firm* — Armstrong Teasdale LLP

(57) ABSTRACT

Described herein is a process for manufacturing a coated cathode active material including the steps of
(a) providing a particulate electrode active material according to general formula $Li_{1+x}TM_{1-x}O_2$, where TM is Ni,
(b) treating said particulate electrode active material with an aqueous medium that may include a heteropoly acid or a compound of Al or Sb,
(c) removing the water from step (b) at least partially,
(d) optionally, adding at least one heteropoly acid or a compound of Al or Sb, as particulate compound or as aqueous solution or slurry,
(e) optionally, treating the mixture from step (d) thermally,
(f) adding at least one compound selected from the group consisting of $B_2O_3$, boric acid and lithium borates to the solid material obtained from step (e), if applicable, or from step (d) or (c), respectively, and
(g) treating the residue obtained from step (f) thermally.

7 Claims, No Drawings

PROCESS FOR MAKING A COATED ELECTRODE ACTIVE MATERIAL

CROSS-REFERENCE TO RELATED APPLICATIONS

This application is a U.S. National Phase Application of PCT/EP2021/075437, filed Sep. 16, 2021, which claims the benefit of priority to European Patent Application No. 20202235.6, filed Oct. 16, 2020, the entire contents of which are hereby incorporated by reference herein.

The present invention is directed towards a process for the manufacture of a coated cathode active material comprising the steps of
(a) providing a particulate electrode active material according to general formula $Li_{1+x}TM_{1-x}O_2$, wherein TM is Ni and, optionally, at least one of Co and Mn, and, optionally, at least one element selected from Al, Mg, and Ba, transition metals other than Ni, Co, and Mn, and x is in the range of from zero to 0.2, wherein at least 50 mole-% of the transition metal of TM is Ni,
(b) treating said particulate electrode active material with an aqueous medium that may contain a heteropoly acid or a compound of Al or Sb,
(c) removing the water from step (b) at least partially,
(d) optionally, adding at least one heteropoly acid or a compound of Al or Sb, as particulate compound or as aqueous solution or slurry,
(e) optionally, treating the mixture from step (d) thermally,
(f) adding at least one compound selected from compounds of Al or Sb or B, or at least one heteropoly acid or its respective ammonium or lithium salt or salt of Al, Ga, In, or Ba to the solid material obtained from step (e), if applicable, or from step (d) or (c), respectively, thereby depositing at least one element selected from on the surface of said particulate electrode active material, wherein the element deposited in step (f) is different from the element deposited in step (b) or (d), respectively, and
(g) treating the residue obtained from step (f) thermally, wherein either step (d) is performed or the aqueous medium in step (b) contains a heteropoly acid or a compound of Al or Sb, or both.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

Currently, a certain interest in so-called Ni-rich electrode active materials may be observed, for example electrode active materials that contain 75 mole-% or more of Ni, referring to the total TM content.

One problem of lithium ion batteries—especially of Ni-rich electrode active materials—is attributed to undesired reactions on the surface of the electrode active materials. Such reactions may be a decomposition of the electrolyte or the solvent or both. It has thus been tried to protect the surface without hindering the lithium exchange during charging and discharging. Examples are attempts to coat the electrode active materials with, e.g., aluminium oxide or calcium oxide, see, e.g., U.S. Pat. No. 8,993,051.

Other theories assign undesired reactions to free LiOH or $Li_2CO_3$ on the surface. Attempts have been made to remove such free LiOH or $Li_2CO_3$ by washing the electrode active material with water, see, e.g., JP 4,789,066 B, JP 5,139,024 B, and US2015/0372300. However, in some instances it was observed that the properties of the resultant electrode active materials did not improve.

It was an objective of the present invention to provide a process for making Ni-rich electrode active materials with excellent electrochemical properties. It was also an objective to provide Ni-rich electrode active materials with excellent electrochemical properties, especially a low resistance growth upon cycling.

Accordingly, the process defined at the outset has been found, hereinafter also referred to as "inventive process". The inventive process comprises the following steps:
(a) providing a particulate electrode active material according to general formula $Li_{1+x}TM_{1-x}O_2$, wherein TM is Ni and, optionally, at least one of Co and Mn, and, optionally, at least one element selected from Al, Mg, and Ba, transition metals other than Ni, Co, and Mn, and x is in the range of from zero to 0.2, wherein at least 50 mole-% of the transition metal of TM is Ni,
(b) treating said particulate electrode active material with an aqueous medium that may contain a heteropoly acid or a compound of Al or Sb,
(c) removing the water from step (b) at least partially,
(d) optionally, adding at least one heteropoly acid or a compound of Al or Sb, as particulate compound or as aqueous solution or slurry,
(e) optionally, treating the mixture from step (d) thermally,
(f) adding at least one compound selected from compounds of Al or Sb or B, or at least one heteropoly acid or its respective ammonium or lithium salt or salt of Al, Ga, In, or Ba to the solid material obtained from step (e), if applicable, or from step (d) or (c), respectively, thereby depositing at least one element selected from on the surface of said particulate electrode active material, wherein the element deposited in step (f) is different from the element deposited in step (b) or (d), respectively, and
(g) treating the residue obtained from step (f) thermally, wherein either step (d) is performed or the aqueous medium in step (b) contains a heteropoly acid or a compound of Al or Sb or both, which means that step (d) is performed and the aqueous medium in step (b) contains a heteropoly acid or a compound of Al or Sb.

The inventive process comprises at least five steps, (a), (b), (c), (f), and (g), in the context of the present invention also referred to as step (a) and step (b) and step (c) and step (f) and step (g), respectively. Steps (a) to (g) are performed subsequently. Steps (d) and (e) are optional.

In step (a), the inventive process starts off from an electrode active material according to general formula $Li_{1+x}TM_{1-x}O_2$, wherein TM comprises Ni and, optionally, at least one transition metal selected from Co and Mn, and, optionally, at least one element selected from Al, Mg and Ba, and, wherein at least 50 mole-% of TM is Ni, preferably at least 75 mole-%, and x is in the range of from zero to 0.2. Said material is hereinafter also referred to as starting material.

In one embodiment of the present invention the starting material has an average particle diameter (D50) in the range of from 3 to 20 μm, preferably from 4 to 16 μm. The average particle diameter can be determined, e. g., by light scattering or LASER diffraction or electroacoustic spectroscopy. The particles are usually composed of agglomerates from primary particles, and the above particle diameter refers to the secondary particle diameter.

In one embodiment of the present invention, the starting material has a specific surface (BET), hereinafter also referred to as "BET surface", in the range of from 0.1 to 2.0 m²/g. The BET surface may be determined by nitrogen adsorption after outgassing of the sample at 200° C. for 30 minutes or more and beyond this accordance with DIN ISO 9277:2010.

In one embodiment of the present invention, the particulate material provided in step (a) has a moisture content in the range of from 20 to 2,000 ppm, determined by Karl-Fischer titration, preferred are 50 to 1,200 ppm.

In one embodiment of the present invention, the variable TM corresponds to general formula (I)

$(Ni_aCo_bMn_c)_{1-d}M_d$ (I)

with a+b+c=1 and a being in the range of from 0.6 to 0.99, preferably from 0.75 to 0.95, more preferably from 0.85 to 0.95, b being zero or in the range of from 0.01 to 0.2, preferably from 0.025 to 0.2, more preferably from 0.025 to 0.1, c being in the range of from zero to 0.2, preferably from 0.025 to 0.2, more preferably from 0.05 to 0.1, d being in the range of from zero to 0.1, preferably from zero to 0.04, $M^1$ is at least one of Al, Mg, Ti, Nb, Mo, W and Zr, preferably at least one of Al, Ti, Zr and W.

In one embodiment of the present invention, the variable c is zero, $M^1$ is Al, and d is in the range of from 0.01 to 0.05.

In another embodiment of the present invention, the variable TM corresponds to general formula (Ia)

$(Ni_{a*}Co_{b*}Al_{e*})_{1-d*}M^2_{d*}$ (Ia)

with a*+b*+c*=1 and a* being in the range of from 0.75 to 0.95, preferably from 0.88 to 0.95, b* being in the range of from 0.025 to 0.2, preferably from 0.025 to 0.1, e* being in the range of from 0.01 to 0.2, preferably from 0.015 to 0.04, d* being in the range of from zero to 0.1, preferably from zero to 0.02, $M^2$ is at least one of W, Mo, Nb, Mg, Ti or Zr.

The variable x in formula (Ia) is in the range of from zero to 0.2, preferably from 0.01 to 0.1.

In one embodiment of the present invention TM corresponds to general formula (I) and x is in the range from zero to 0.2, preferably from zero to 0.1 and even more preferably 0.01 to 0.05.

In one embodiment of the present invention, TM is selected from $Ni_{0.6}Co_{0.2}Mn_{0.2}$, $Ni_{0.7}Co_{0.2}Mn_{0.1}$, $Ni_{0.8}Co_{0.1}Mn_{0.1}$, $Ni_{0.83}Co_{0.12}Mn_{0.05}$, $Ni_{0.89}Co_{0.055}Al_{0.055}$, $Ni_{0.91}Co_{0.045}Al_{0.045}$ and $Ni_{0.85}Co_{0.1}Mn_{0.05}$.

The electrode active material provided in step (a) is usually free from conductive carbon, that means that the conductive carbon content of starting material is less than 1% by weight, referring to said starting material, preferably 0.001 to 1.0% by weight.

Some elements are ubiquitous. In the context of the present invention, traces of ubiquitous metals such as sodium, calcium, iron or zinc, as impurities will not be taken into account in the description of the present invention.

Traces in this context will mean amounts of 0.02 mol-% or less, referring to the total metal content of the starting material.

In step (b), said electrode active material provided in step (a) is treated with an aqueous medium, preferably with water. Said aqueous medium may have a pH value in the range of from 2 up to 14, preferably at least 3.5, more preferably from 5 to 7. The pH value is measured at the beginning of step (b). It is observed that in the course of step (b), the pH value raises to at least 10, for example 11 to 13. In embodiments wherein the pH value is in the range of from 10 to 11 at the beginning of step (b) it raises to more than 11 to up to 13. In embodiments wherein the pH value is in the range of 3 to below 10 at the beginning of step (b) it raises to 11 to up to 13 in the course of step (b).

It is preferred that the water hardness of said aqueous medium used in step (b) is at least partially removed, especially calcium. The use of desalinized water is preferred.

In one embodiment of the present invention, said aqueous medium may contain at least one heteropoly acid, or its respective ammonium or lithium salt, or a compound selected from compounds of Al or Sb, dissolved or slurried.

In one embodiment of the present invention, heteropoly acid present in step (b) is selected from phosphotungstic acid, phosphomolybdic acid, tungstosilicic acid, molybdosilicic acid and combinations of at least two of the foregoing, and their respective ammonium and lithium salts, for example the mono-, di- or triammonium salts and the mono-, di- and trilithium salts. Preferred are heterpolyacids of tungsten, especially phosphotungstic acid and tungstosilicic acid and their respective ammonium and lithium salts, for example the mono-, di- or triammonium salts.

Examples of heteropoly acids are $M^3_3[PW_{12}O_{40}]$, $M^3[PW_{12}O_{40}]$, $M^3_4[SiW_{12}O_{40}]$, $M^3_2[SiW_{12}O_{40}]$, $M^3_9[(W_9O_{34})]$, $M^3_6(P_2W_{21}O_{71})$, $M^3_3(PW_{12}O_{40})$, $M^3_4(SiW_{12}O_{40})$, $M^3_6(P_2W_{18}O_{62})$; $M^3_7(PW_{11}O_{36})$, and $M^3_{10}(SiW_6O_{34})$, with $M^3$ being selected from H, $NH_4^+$, Li and combinations of at least two of the foregoing. Possible are embodiments as well where $M^3$ is selected from Al, Ga, In, Ba, and the stoichiometric coefficients are adjusted accordingly.

In one embodiment of the present invention, the amount of heteropoly acid or compound of Al or Sb is in the range of from 0.05 to 1.5 mol-%, preferably 0.15 to 0.9 mol-%, referring to TM.

Examples of compounds of Al or Sb used in step (b) are selected from water-soluble and water-insoluble compounds. Examples of water-soluble compounds of Al are $Al_2(SO_4)_3$, $KAl(SO_4)_2$, or $Al(NO_3)_3$. "Water-soluble" in this context means a solubility of at least 10 g Al or Sb, respectively, compound/l water at 25° C.

In other embodiments, said inorganic compound of Al is water-insoluble. "Water-insoluble" in this context means a solubility of less than 0.1 g compound of Al/l water at 25° C. Examples are, e.g., $Al_2O_3$, $Al(OH)_3$, AlOOH, $Al_2O_3 \cdot aq$, preference being given to AlOOH and $Al_2O_3$.

Examples of water-insoluble compounds of Sb are compounds of Sb(+III) and of Sb(+V). Examples of compounds of Sb(+III) are $Sb(OH)_3$, $Sb_2O_3 \cdot aq$, $Sb_2(SO_4)_3$, SbOOH, $LiSbO_2$, and $Sb_2O_3$. Examples of compounds of Sb(+V) are $Sb_2O_6$, $LiSb_3O_8$, $LiSbO_3$, $Li_3SbO_4$, $LiSbO_6$, $Li_7SbO_6$, $Sb_2O_4$ (Sb(III)Sb(V)$O_4$), and oxyhydroxides of Sb(+V) such as, but not limited to $SbO(OH)_3$, $Sb_2O_4(OH)_2$, $Sb_2O_3(OH)_4$, $Sb_3O_6OH$, $Sb_3O_7OH$. Preferred are $Sb(OH)_3$, $Sb_2O_3 \cdot aq$ and $Sb_2O_3$. Examples of water-soluble compounds are $Sb_2(SO_4)_3$, $SbONO_3$, and $Sb(NO_3)_3$.

Said water-insoluble compound of Al or Sb may be dispersed or slurried in water.

In the context of the present invention, AlOOH does not necessarily bear equal molar amounts of oxide and hydroxide and is sometimes also named as Al(O)(OH). The same applies mutatis mutandis to SbOOH.

Compounds of Al or Sb, respectively, and especially $Al_2O_3$ and Al(O)(OH) used in step (b) may be pure (≥99.9 mole % Al, referring to total metals including Si) or doped with oxides such as $La_2O_3$, $Ce_2O_3$, titania or zirconia, in amounts of for example 0.1 to 5 mole %.

More preferred compounds of Al and Sb in step (b) are $Al_2(SO_4)_3$ and $Sb_2O_3$.

In one embodiment of the present invention, said water-insoluble compound of Al or Sb has an average particle diameter (D50) in the range of from 10 nm to 10 µm, preferably 10 nm to 3 µm. The average diameter (D50) may be determined by imaging processes such as SEM.

In another embodiment, said aqueous medium does not contain any of heteropoly acids or the respective lithium or ammonium salts or compounds of Al or Sb, neither dissolved nor slurried.

In one embodiment of the present invention, step (b) is performed at a temperature in the range of from 5 to 85° C., preferred are 10 to 60° C.

In one embodiment of the present invention, step (b) is performed at normal pressure. It is preferred, though, to perform step (b) under elevated pressure, for example at 10 mbar to 10 bar above normal pressure, or with suction, for example 50 to 250 mbar below normal pressure, preferably 100 to 200 mbar below normal pressure.

Step (b) may be performed, for example, in a vessel that can be easily discharged, for example due to its location above a filter device. Such vessel may be charged with starting material followed by introduction of aqueous medium. In another embodiment, such vessel is charged with aqueous medium followed by introduction of starting material. In another embodiment, starting material and aqueous medium are introduced simultaneously.

In one embodiment of the present invention, in step (b), the amounts of water and electrode active material have a weight ratio in the range of from 1:5 to 5:1, preferably from 2:1 to 1:2.

Step (b) may be supported by mixing operations, for example shaking or in particular by stirring or shearing, see below.

In one embodiment of the present invention, step (b) has a duration in the range of from 1 minute to 90 minutes, preferably 1 minute to less than 60 minutes. A duration of 5 minutes or more is possible in embodiments wherein in step (b), water treatment and water removal are performed overlapping or simultaneously.

In one embodiment of the present invention, treatment according to step (b) and water removal according to step (c) are performed consecutively.

After or during the treatment with an aqueous medium in accordance to step (b), water may be removed by any type of filtration, for example on a band filter or in a filter press.

In one embodiment of the present invention, at the latest 5 minutes after commencement of step (b), step (c) is started. Step (c) includes partially removing the water from treated particulate material, for example by way of a solid-liquid separation, for example by decanting or preferably by filtration. Said "partial removal" may also be referred to as partially separating off.

In one embodiment of step (c), the slurry obtained in step (b) is discharged directly into a centrifuge, for example a decanter centrifuge or a filter centrifuge, or on a filter device, for example a suction filter or in a filter press or in a belt filter that is located preferably directly below the vessel in which step (b) is performed. Then, filtration is commenced.

In a particularly preferred embodiment of the present invention, steps (b) and (c) are performed in a filter press or in a filter device with stirrer, for example a pressure filter with stirrer or a suction filter with stirrer (German for example: "Rührfilternutsche"). At most 5 minutes after, preferably at most 3 minutes after—or even immediately after—having combined starting material and aqueous medium in accordance with step (b), removal of aqueous medium is commenced by starting the filtration. On laboratory scale, steps (b) and (c) may be performed on a Büchner funnel, and steps (b) and (c) may be supported by manual stirring.

In a preferred embodiment, step (b) is performed in a filter device, for example a stirred filter device that allows stirring of the slurry in the filter or of the filter cake.

In one embodiment of the present invention, the water removal in accordance to step (c) has a duration in the range of from 1 minute to 1 hour.

In one embodiment of the present invention, stirring in step (b)—and (c), if applicable—is performed with a rate in the range of from 1 to 50 revolutions per minute ("rpm"), preferred are 5 to 20 rpm. In other embodiments, it is 200 to 400 rpm.

In one embodiment of the present invention, filter media may be selected from ceramics, sintered glass, sintered metals, organic polymer films, non-wovens, and fabrics.

In one embodiment of the present invention, steps (b) and (c) are carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform steps (b) and (c) under an atmosphere with a carbon dioxide content below detection limit for example with infrared-light based optical methods.

From step (c), a solid residue is obtained, preferably in the form of a wet filter cake. The moisture content of the solid residue and especially of the filter cake may be in the range of from 3 to 20% by weight, preferably 4 to 9% by weight.

In the optional step (d), said at least one compound of Al or Sb, preferably in the absence of solvent or with up to 10% by volume of solvent, is added to the solid residue resulting from step (c), with in step (a). In this context, the term solvent refers to liquids at the temperature of step (d) and encompasses organic solvents and water and mixtures thereof. The percentage refers to the volume of solid residue resulting from step (c).

In one embodiment of the present invention, step (d) is performed by adding a concentrated aqueous slurry or paste of an oxide or (oxy)hydroxide of Al or Sb or a solution of a heteropoly acid to the solid residue resulting from step (c).

In one embodiment of the present invention, step (d) is performed in a mixer, for example in a paddle mixer, a plough-share mixer, a free-fall mixer, a roller mill, or a high-shear mixer. Free fall mixers are using the gravitational force to achieve mixing. Plough-share mixers are preferred.

In one embodiment of the present invention the mixer operates in step (d) with a speed in the range of from 5 to 500 revolutions per minute ("rpm"), preferred are 5 to 60 rpm. In embodiments wherein a free-fall mixer is applied, from 5 to 25 rpm are more preferred and 5 to 10 rpm are even more preferred. In embodiments wherein a plough-share mixer is applied, 50 to 400 rpm are preferred and 100 to 250 rpm are even more preferred. In the case of high-shear mixers, 100 to 950 rpm of the agitator and 100 to 3,750 rpm of the chopper are preferred.

In one embodiment of the present invention, the duration of step (d) is in the range of from one minute to 2 hours, preferred are ten minutes to one hour.

In one embodiment of the present invention, step (d) is preferred at a temperature in the range of from 10 to 80° C. Even more preferred is ambient temperature.

In one embodiment of the present invention, step (d) is performed in an air atmosphere, or under an inert gas such as nitrogen. Ambient air is preferred.

From step (d), a mixture is obtained. In embodiments in which water is used the mixture has the appearance of a moist powder or of a dry powder.

Examples of particulate compounds of Sb are $Sb(OH)_3$, $Sb_2O_3 \cdot aq$, $Sb_2(SO_4)_3$, $SbOOH$, $LiSbO_2$, and $Sb_2O_3$. Examples of compounds of Sb(+V) are $Sb_2O_6$, $LiSb_3O_8$, $LiSbO_3$, $Li_3SbO_4$, $Li_5SbO_6$, $Li_7SbO_6$, $Sb_2O_4$ (Sb(III)Sb(V)$O_4$), and oxyhydroxides of Sb(+V) such as, but not limited to $SbO(OH)_3$, $Sb_2O_4(OH)_2$, $Sb_2O_3(OH)_4$, $Sb_3O_6OH$, and $Sb_3O_7OH$.

Examples of particulate compounds of Al are $Al_2O_3$, $Al(OH)_3$, $AlOOH$, $Al_2O_3 \cdot aq$, preference being given to $AlOOH$ and $Al_2O_3$.

More preferred compounds of Al and Sb in step (d) are $Al_2(SO_4)_3$ and $Sb_2O_3$.

In one embodiment of the present invention, the weight ratio of solid residue material from step (c) and heteropoly acid or compound of Al or Sb is in the range of from 1000:1 to 10 to 1, preferably 100:1 to 20:1.

In one embodiment of the present invention, compound of Al or Sb in step (d) is particulate and has an average diameter (D50) in the range of from 10 nm to 10 μm, preferably 10 nm to 1 μm. The average diameter (D50) may be determined by imaging processes such as SEM.

In one embodiment of the present invention, the duration of step (d) is in the range of from one minute to 2 hours, preferred are ten minutes to one hour.

In one embodiment of the present invention, step (d) is preferred at a temperature in the range of from 10 to 80° C. Even more preferred is ambient temperature.

In one embodiment of the present invention, step (d) is performed in an air atmosphere, or under an inert gas such as nitrogen. Ambient air is preferred.

From step (b), a mixture is obtained. In embodiments in which water is used the mixture has the appearance of a moist powder. By performing step (d) least one element—Sb, Al or the respective elements from heteropoly acid—is deposited on the solid residue resulting from step (c).

In an optional step (e), water or solvent is removed at least partially from the mixture obtained from step (d), for example by evaporation. In a preferred embodiment of step (e), the water is evaporated at least partially at a temperature in the range of from 40 to 250° C. Preferably, water evaporation is performed at 0.1 to 10 mbar ("in vacuum").

In step (f), at least one compound selected from compounds of Al or Sb, or at least one heteropoly acid or its respective ammonium or lithium salt is added to the solid material obtained from step (e), if applicable, or from step (d) or (c), respectively, thereby depositing at least one element selected from Al, Sb, B, Mo, W, Si and P on the surface of said particulate electrode active material, wherein the element deposited in step (f) is different from the element deposited in steps (b) or (d). Such compound may be added as a slurry or solution or as dry powder, preferred are dry powders.

Thus, step (f) is performed on the solid material obtained from step (e) if a step (e) is performed. In embodiments wherein no step (e) is performed, step (f) is performed on the mixture obtained from step (d) if applicable. In embodiments wherein neither step (d) not step (e) is performed, step (f) is performed on the solid material obtained from step (c).

Examples of compounds of aluminum added in step (f) are selected from the same as disclosed in the context with step (c), water-insoluble compounds of Al being preferred. In one embodiment of the present invention, said water-insoluble aluminum compound has an average particle diameter (D50) in the range of from 200 nm to 5 μm, preferably 2 to 5 μm, dispersed in water and determined by X-ray diffraction.

Examples of compounds of boron are $B_2O_3$, boric acid ($B(OH)_3$) and lithium borates, for example $LiBO_2$. Boric acid is preferred.

Examples of compounds of antimony are compounds of Sb(+III) and of Sb(+V). Examples of compounds of Sb(+III) are $Sb(OH)_3$, $Sb_2O_3 \cdot aq$, $Sb_2(SO_4)_3$, $SbOOH$, $LiSbO_2$, and $Sb_2O_3$. Examples of compounds of Sb(+V) are $Sb_2O_6$, $LiSb_3O_8$, $LiSbO_3$, $Li_3SbO_4$, $Li_5SbO_6$, $Li_7SbO_6$, $Sb_2O_4$ (Sb(III)Sb(V)$O_4$), and oxyhydroxides of Sb(+V) such as, but not limited to $SbO(OH)_3$, $Sb_2O_4(OH)_2$, $Sb_2O_3(OH)_4$, $Sb_3O_6OH$, $Sb_3O_7OH$. Preferred are $Sb(OH)_3$, $Sb_2O_3 \cdot aq$ and $Sb_2O_3$.

In one embodiment of the present invention, heteropoly acid added in step (f) is selected from phosphotungstic acid, phosphomolybdic acid, tungstosilicic acid, molybdosilicic acid and combinations of at least two of the foregoing, and their respective ammonium and lithium salts, for example the mono-, di- or triammonium salts and the mono-, di- and trilithium salts. Preferred are heterpolyacids of tungsten, especially phosphotungstic acid and tungstosilicic acid and their respective ammonium and lithium salts, for example the mono-, di- or triammonium salts.

Specific examples of heteropoly acids are $M^3{}_3[PW_{12}O_{40}]$, $M^3[PW_{12}O_{40}]$, $M^3{}_4[SiW_{12}O_{40}]$, $M^3{}_2[SiW_{12}O_{40}]$, $M^3{}_9[(W_9O_{34})$, $M^3{}_6(P_2W_{21}O_{71})$, $M^3{}_3(PW_{12}O_{40})$, $M^3{}_4(SiW_{12}O_{40})$, $M^3{}_6(P_2W_{18}O_{62})$; $M^3{}_7(PW_{11}O_{36})$, and $M^3{}_{10}(SiW_6O_{34})$, with $M^3$ being selected from H, $NH_4{}^+$, Li and combinations of at least two of the foregoing. Possible are embodiments as well where $M^3$ is selected from Al, Ga, In, Ba, and the stoichiometric coefficients are adjusted accordingly.

In one embodiment of the present invention, the amount of heteropoly acid or compound of Al or Sb is in the range of from 0.05 to 1.5 mol-%, preferably 0.15 to 0.9 mol-%, referring to TM.

When performing step (f), the selection of compound of Sb or Al or B or heteropoly acid is made in a way that by performing step (f) at least one element selected from Al, Sb, B, Mo, W, Si and P is deposited on the surface of said particulate electrode active material, and wherein the element deposited in step (f) is different from the element deposited in step (b) and (d).

In one embodiment of the present invention, the at least one compound of Al or B or Sb or heteropoly acid is added as a particulate solid, for example as a dry powder. Especially in embodiments wherein a step (e) has been performed step (f) is performed by adding compound of Al or B or Sb or heteropoly acid as a dry powder. "Dry powder" refers to a residual moisture content of 0.1% by weight or less, determined by Karl-Fischer titration.

Step (f) may be supported by mixing operations, for example shaking or in particular by stirring or shearing or milling, see below.

In one embodiment of the present invention, step (f) has a duration in the range of from 1 minute to 60 minutes, preferably 1 minute to less than 30 minutes. A duration of 5 minutes or more is possible in embodiments wherein in step (f), water treatment and water removal are performed overlapping or simultaneously.

In one embodiment of the present invention, step (f) is preferred at a temperature in the range of from 10 to 80° C. Even more preferred is ambient temperature.

In one embodiment of the present invention, step (f) is performed in an air atmosphere, or under an inert gas such as nitrogen. Ambient air is preferred.

In one embodiment of the present invention, steps (c) to (f) are performed in the same type of vessel, for example in a filter device with stirrer, for example a pressure filter with stirrer or a suction filter with stirrer.

The inventive process includes a subsequent step (g):
(g) thermal treatment of the material obtained from step (f).

Said step (g) is particularly preferred in embodiments wherein said compound(s) of Al or B or Sb or heteropoly acid are added as aqueous slurry or aqueous solution.

Step (g) may be carried out in any type of oven, for example a roller hearth kiln, a pusher kiln, a rotary kiln, a pendulum kiln, or—for lab scale trials—in a muffle oven.

The temperature of the thermal treatment according to step (g) may be in the range of from 150 to 900° C., preferably 250 to 700° C. and even more preferably from 300 to 650° C. Said temperature refers to the maximum temperature of step (g).

In one embodiment of the present invention, the temperature is ramped up before reaching the desired temperature of from 150 to 900° C., preferably 250 to 700° C. For example, first the mixture of step (f) is heated to a temperature to 350 to 550° C. and then held constant for a time of 10 min to 4 hours, and then it is raised to 500 to 900° C., preferably 500 to 850° C.

In one embodiment of the present invention, the heating rate in step (g) is in the range of from 0.1 to 10° C./min.

In one embodiment of the present invention, step (g) is performed in a roller hearth kiln, a pusher kiln or a rotary kiln or a combination of at least two of the foregoing. Rotary kilns have the advantage of a very good homogenization of the material made therein. In roller hearth kilns and in pusher kilns, different reaction conditions with respect to different steps may be set quite easily. In lab scale trials, box-type and tubular furnaces and split tube furnaces are feasible as well.

In one embodiment of the present invention, step (g) is performed in an oxygen-containing atmosphere, for example in a nitrogen-air mixture, in a rare gas-oxygen mixture, in air, in oxygen or in oxygen-enriched air or in pure oxygen. In a preferred embodiment, the atmosphere in step (g) is selected from air, oxygen and oxygen-enriched air. Oxygen-enriched air may be, for example, a 50:50 by volume mix of air and oxygen. Other options are 1:2 by volume mixtures of air and oxygen, 1:3 by volume mixtures of air and oxygen, 2:1 by volume mixtures of air and oxygen, and 3:1 by volume mixtures of air and oxygen. Pure oxygen is even more preferred.

In one embodiment of the present invention, step (g) has a duration in the range of from 30 minutes to 5 hours. Preferred are 60 minutes to 4 hours. The cooling time is neglected in this context.

By carrying out the inventive process, electrode active materials are obtained with excellent electrochemical properties. Without wishing to be bound by any theory, we assume that the decomposition products of heteropoly acid or of B or Sb or Al—as the case may be—may lead to scavenging lithium compounds deposited at the surface of the electrode active material.

In one embodiment of

Cathode active materials obtained by the inventive process have numerous advantages. Cathodes made from such cathode active materials display a reduced resistance growth upon cycling.

The invention is further illustrated by working examples.
General remarks: N-methyl-2-pyrrolidone: NMP.
$H_4(SiW_{12}O_{40}) \cdot nH_2O$ (n=30) was dissolved in water. The resulting solution is named "$SiW_{12}$ aq".
Ultra-dry air: dehumidified air, dew point of less than −30° C., and $CO_2$ content less than 50 ppm "in vacuo": 0.1 to 10 mbar I. Synthesis of a Cathode Active Material I.1 Synthesis of a Precursor TM-OH.1

A stirred tank reactor was filled with deionized water and 49 g of ammonium sulfate per kg of water. The solution was tempered to 55° C. and a pH value of 12 was adjusted by adding an aqueous sodium hydroxide solution.

The co-precipitation reaction was started by simultaneously feeding an aqueous transition metal sulfate solution and aqueous sodium hydroxide solution at a flow rate ratio of 1.8, and a total flow rate resulting in a residence time of 8 hours. The transition metal solution contained Ni, Co and Mn at a molar ratio of 8.3:1.2:0.5 and a total transition metal concentration of 1.65 mol/kg. The aqueous sodium hydroxide solution was a 25 wt. % sodium hydroxide solution and 25 wt. % ammonia solution in a weight ratio of 6. The pH value was kept at 12 by the separate feed of an aqueous sodium hydroxide solution. Beginning with the start-up of all feeds, mother liquor was removed continuously. After 33 hours all feed flows were stopped. The mixed transition metal (TM) hydroxide precursor TM-OH.1 was obtained by filtration of the resulting suspension, washing with distilled water, drying at 120° C. in air and sieving.

I.2 Conversion of TM-OH.1 into Cathode Active Materials

I.2.1 Manufacture of a Base Cathode Active Material, B-CAM.1, Step (a.1)

B-CAM.1 (base): The mixed transition metal hydroxide precursor TM-OH.1 was mixed with LiOH monohydrate in a Li/TM molar ratio of 1.03. The mixture was heated to 765° C. and kept for 10 hours in a forced flow of a mixture of oxygen. After cooling to ambient temperature, the resultant powder was deagglomerated and sieved through a 32 µm mesh to obtain the base cathode active material B-CAM 1.

D50=11.0 µm determined using the technique of laser diffraction in a Mastersize 3000 instrument from Malvern Instruments. The residual moisture at 250° C. was determined to be 300 ppm.

I.2.2 Manufacture Cathode Active Materials, Steps (b.1) to (g.1)

I.2.2.1 Manufacture of C-CAM.1

Step (b.1): A beaker was charged with 67 ml of de-ionized water. An amount of 100 g B-CAM.1 was added. The resultant slurry was stirred at ambient temperature over a period of 5 minutes, during said stirring the slurry temperature was maintained at 25° C.

Step (c.1): Then, the water was removed by filtration through a filter press. A wet filter cake remained.

No steps (d) or (f) were performed.

Step (e.1): The resultant filter cake was dried in vacuo at 70° C. for 2 hours and then at 185° C. over a period of 10 hours. A powder was obtained.

Step (g.1): Then, by sieving the powder obtained from step (e.1) with a mesh 45 µm sieve, comparative cathode active material C-CAM.1 was obtained.

I.2.2.2 Manufacture of a Comparative Cathode Active Material, Steps (b.2) to (g.2)

Step (b.2): A beaker was charged with 67 ml of de-ionized water. An amount of 100 g B-CAM.1 was added. The resultant slurry was stirred at ambient temperature over a period of 5 minutes, during said stirring the slurry temperature was maintained at 25° C.

Step (c.2): Then, the water was removed by filtration through a filter press. A wet filter cake remained.

No step (d) to was performed.

Step (e.2): The resultant filter cake was dried in vacuo at 70° C. for 2 hours and then at 185° C. over a period of 10 hours.

Step (f.2): Then, 0.57 g (0.9 mol) boric acid were added and mixing was performed in a high speed mixer at 25.000 rpm. A mixture was obtained.

Step (g.2): The resulting mixture was thermally treated at 300° C. for 2 hours in a muffle furnace and in a forced flow of oxygen. Then, by sieving the resultant powder with a mesh 45 µm sieve, comparative cathode active material C-CAM.2 was obtained.

I.2.2.3: Synthesis of CAM.3

Step (b.3): An amount of 100 g B-CAM.1 was slurried in de-ionized water (conductivity of water less than 5 µS/m) under constant stirring. An aqueous solution of 0.3 mol-% $Al_2(SO_4)_3$ (with respect to TM in B-CAM.1) was added. The total amount of de-ionized water used is 67 ml. The resultant slurry was stirred at ambient temperature over a period of 5 minutes.

Step (c.3): Then, the water was removed by filtration through a filter press. A wet filter cake remained.

No step (d) to was performed.

Step (e.3): The resultant filter cake was dried in vacuo at 70° C. for 2 hours and then at 185° C. over a period of 10 hours.

Step (f.3): Then, 0.57 g (0.9 mol) boric acid were added and mixing was performed in a high speed mixer at 25.000 rpm. A mixture was obtained.

Step (g.3): The resulting mixture was thermally treated at 300° C. for 2 hours in a muffle furnace and in a forced flow of oxygen. Then, by sieving the resultant powder with a mesh 45 µm sieve, inventive cathode active material CAM.3 was obtained.

I.2.2.4: Synthesis of CAM.4

Step (b.4): An amount of 100 g B-CAM.1 was slurried in de-ionized water (conductivity less than µS/m) under constant stirring. An aqueous solution of 0.3 mol-% $Al_2(SO_4)_3$ (with respect to TM in B-CAM.1) was added. The total amount of de-ionized water used was 67 ml. The resultant slurry was stirred at ambient temperature over a period of 5 minutes.

Step (c.4): Then, the water was removed by filtration through a filter press. A wet filter cake remained.

Step (d.4): SiWi2 aq. was added to the wet filter cake from (c.4). The molar ratio of W/TM was 0.0015. The resultant mixture was transferred into a plastic bag and scrambled for 5 minutes at ambient temperature.

Step (e.4): The resultant filter cake was dried in ultra-dry air at 70° C. for 2 hours and then at 185° C. over a period of 10 hours.

Step (f.4): Then, 0.57 g (0.9 mol) boric acid were added and mixing was performed in accordance with (f.3). A mixture was obtained.

Step (g.4): The resulting mixture was thermally treated at 300° C. for 2 hours in a muffle furnace and in a forced flow of oxygen. Then, by sieving the resultant powder with a mesh 45 µm sieve, inventive cathode active material CAM.4 was obtained.

I.2.2.5: Synthesis of CAM.5

Step (b.5): An amount of 100 g B-CAM.1 was slurried in de-ionized water (conductivity less than µS/m) under constant stirring. A suspension of 0.45 mol-% $Sb_2O_3$ (with respect to TM in BCAM.1), was added to the slurry. The total amount of de-ionized water used was 67 ml. The resultant slurry was stirred at ambient temperature over a period of 5 minutes.

Step (c.5): Then, the water was removed by filtration through a filter press. A wet filter cake remained.

No step (d) was performed.

Step (e.5): The resultant filter cake was dried in vacuo at 70° C. for 2 hours and then at 185° C. over a period of 10 hours.

Step (f.5): Then, 0.57 g (0.9 mol) boric acid (with respect to TM in B-CAM.1) were added and mixing was performed in accordance with (f.3). A mixture was obtained.

Step (g.5): The resulting mixture was thermally treated at 300° C. for 2 hours in a muffle furnace and in a forced flow of oxygen. Then, by sieving the resultant powder with a mesh 45 µm sieve, inventive cathode active material CAM.5 was obtained.

1.2.2.6: Synthesis of CAM.6

Step (b.6): An amount of 100 g B-CAM.1 was slurried in de-ionized water (conductivity less than 5 µS/m) under constant stirring. A suspension of 0.45 mol-% $Sb_2O_3$ (with respect to TM in BCAM.1), was added to the slurry. The total amount of de-ionized water used is 67 mL. The resultant slurry was stirred at ambient temperature over a period of 5 minutes.

Step (c.6): Then, the water was removed by filtration through a filter press. A wet filter cake remained. Step (d.6): SiWi2 aq. was added to the wet filter cake from step (c.6). The molar ratio of W/TM was 0.0015. The resultant mixture was transferred into a plastic bag and scrambled for 5 minutes at ambient temperature.

Step (e.6): The resultant filter cake was dried in vacuo at 70° C. for 2 hours and then at 185° C. over a period of 10 hours.

Step (f.6): Then, 0.57 g (0.9 mol) boric acid (with respect to TM in B-CAM.1) were added and mixing was performed in accordance with (f.3). A mixture was obtained.

Step (g.6): The resulting mixture was thermally treated at 300° C. for 2 hours in a muffle furnace and in a forced flow of oxygen. Then, by sieving the resultant powder with a mesh 45 µm sieve, inventive cathode active material CAM.6 was obtained.

I.2.2.7: Synthesis of CAM.7

Step (b.7): A beaker was charged with 67 ml of de-ionized water. An amount of 100 g B-CAM.1 was added. The resultant slurry was stirred at ambient temperature over a period of 5 minutes, during said stirring the slurry temperature was maintained at 25° C.

Step (c.7): Then, the water was removed by filtration through a filter press. A wet filter cake remained.

Step (d.7): SiWi2 aq. was added to the wet filter cake from step (c.7). The molar ratio of W/TM was 0.0015. The resultant mixture was transferred into a plastic bag and scrambled for 5 minutes at ambient temperature.

Step (e.7): The resultant filter cake was dried in vacuo at 70° C. for 2 hours and then at 185° C. over a period of 10 hours.

Step (f.7): Then, 0.57 g (0.9 mol) boric acid (with respect to TM in B-CAM.1) were added and mixing was performed in accordance with (f.3). A mixture was obtained.

Step (g.7): The resulting mixture was thermally treated at 300° C. for 2 hours in a muffle furnace and in a forced flow of oxygen. Then, by sieving the resultant powder with a mesh 45 μm sieve, inventive cathode active material CAM.7 was obtained.

I.2.2.8: Synthesis of CAM.8

Step (b.8): An amount of 100 g B-CAM.1 was slurried in de-ionized water (conductivity of water less than 5 μS/m) under constant stirring. An aqueous solution of 0.3 mol-% $Al_2(SO_4)_3$ (with respect to TM in B-CAM.1) was added. The total amount of de-ionized water used is 67 ml. The resultant slurry was stirred at ambient temperature over a period of 5 minutes.

Step (c.8): Then, the water was removed by filtration through a filter press. A wet filter cake remained.

No step (d) to was performed.

Step (e.8): The resultant filter cake was dried in vacuo at 70° C. for 2 hours and then at 185° C. over a period of 10 hours.

Step (f.8): Then, 0.43 g (0.675 mol) boric acid were added and mixing was performed in a high-speed mixer at 25.000 rpm. A mixture was obtained.

Step (g.8): The resulting mixture was thermally treated at 300° C. for 2 hours in a muffle furnace and in a forced flow of oxygen. Then, by sieving the resultant powder with a mesh 45 μm sieve, inventive cathode active material CAM.8 was obtained.

The protocols are summarized in Table 1.
The results are summarized in Table 1.

and 61.1 wt % of ethyl methyl carbonate (EMC) (EL base 1), based on the total weight of EL base 1. To this base electrolyte formulation 2 wt. % of vinylene carbonate (VC) was added (EL base 2).

II.3 Test Cell Manufacture

Coin-type half cells (20 mm in diameter and 3.2 mm in thickness) comprising a cathode prepared as described under III.1.1 and lithium metal as working and counter electrode, respectively, were assembled and sealed in an Ar-filled glove box. In addition, the cathode and anode and a separator were superposed in order of cathode//separator//Li foil to produce a half coin cell. Thereafter, 0.15 mL of the EL base 1 which is described above (II.2) were introduced into the coin cell.

III. Evaluation of Coin-Type Half-Cell Performance

Cell performance were evaluated using the produced coin type battery. For the battery performances, initial capacity and reaction resistance of cell were measured. The initial performance and cycle were measured as follows: Coin half cells according to II.3.1 were tested in a voltage range between 4.3 V to 2.8 V at room temperature. For the initial cycles, the initial lithiation was conducted in the CC-CV mode, i.e., a constant current (CC) of 0.1 C was applied until reaching 0.01 C. After 10 min resting time, reductive lithiation was carried out at constant current of 0.1 C up to 2.8 V. The results are summarized in Table 2. For the cycling, the current density was 0.1 C and charge and discharge were repeated 25 times.

The cell reaction resistance growth was calculated by the following method:

TABLE 1

Manufacturing details and composition of CAM

| CAM | Compound added in step (b), mol-% vs. TM | Compound added in step (d), mol-% vs. TM | Step (e), [° C.] | Compound added in step (f), mol-% vs. TM | Step (g), [° C.] |
|---|---|---|---|---|---|
| C-CAM.1 | none | none | 70° C. + 185° C. | none | none |
| C-CAM.2 | none | none | 70° C. + 185° C. | 0.9% $H_3BO_3$ | 300° C. |
| CAM.3 | 0.3% $Al_2(SO_4)_3$ | none | 70° C. + 185° C. | 0.9% $H_3BO_3$ | 300° C. |
| CAM.4 | 0.3% $Al_2(SO_4)_3$ | 0.15% $SiW_{12}$ | 70° C. + 185° C. | 0.9% $H_3BO_3$ | 300° C. |
| CAM.5 | 0.45% $Sb_2O_3$ | none | 70° C. + 185° C. | 0.9% $H_3BO_3$ | 300° C. |
| CAM.6 | 0.45% $Sb_2O_3$ | 0.15% $SiW_{12}$ | 70° C. + 185° C. | 0.9% $H_3BO_3$ | 300° C. |
| CAM.7 | none | 0.15% $SiW_{12}$ | 70° C. + 185° C. | 0.9% $H_3BO_3$ | 300° C. |
| CAM.8 | 0.3% $Al_2(SO_4)_3$ | none | 70° C. + 185° C. | 0.675% $H_3BO_3$ | 300° C. | in case of $SiW_{12}$, mol-% refer to W

II. Testing of Cathode Active Material

II.1 Electrode Manufacture, General Procedure

Positive electrode: PVDF binder (Solef® 5130) was dissolved in NMP (Merck) to produce a 8.0 wt. % solution. For electrode preparation, binder solution (4 wt. %), and carbon black (Li250, 3.5 wt.-%) were suspended in NMP. After mixing using a planetary centrifugal mixer (ARE-250, Thinky Corp.; Japan), either any of inventive CAM.3 to CAM.8 or a base cathode active material B-CAM.1 or a comparative cathode active material, (92.5 wt. %) was added and the suspension was mixed again to obtain a lump-free slurry. The solid content of the slurry was adjusted to 65%. The slurry was coated onto Al foil using a KTF-S roll-to-roll coater (Mathis AG). Prior to use, all electrodes were calendared. The thickness of cathode material was 45 μm, corresponding to 15 mg/cm². All electrodes were dried at 120° C. for 7 hours before battery assembly.

II.2 Electrolyte Manufacture

A base electrolyte composition was prepared containing 12.7 wt % of $LiPF_6$, 26.2 wt % of ethylene carbonate (EC), After the 25 cycles under 0.1 C, the coin cells are recharged to 4.3V, and the resistance is measured again by the electrochemical impedance spectroscopy (EIS) method. The ratio of the resistance value of 26th cycle and second cycle is defined as the resistance growth. The results are summarized in Table 2. [%] relative resistance growth is based on the resistance growth of cell based on C-CAM.1 as 100%.

TABLE 2

Initial charge and discharge capacity with initial reaction resistance, coin cell

| CAM | $1^{st}$ discharge capacity [mA · h/g] | Relative R (resistance) $2^{nd}$ cycle [%] | Relative R growth $R_{26th}/R_{2nd}$ [%] |
|---|---|---|---|
| C-CAM.1 | 213.8 | 100.0 | 100.0 |
| C-CAM.2 | 213.8 | 82.6 | 39.0 |
| CAM.3 | 208.0 | 68.3 | 10.4 |
| CAM.4 | 206.2 | 55.7 | 6.9. |

TABLE 2-continued

Initial charge and discharge capacity with initial reaction resistance, coin cell

| CAM | 1st discharge capacity [mA · h/g] | Relative R (resistance) 2nd cycle [%] | Relative R growth $R_{26th}/R_{2nd}$ [%] |
|---|---|---|---|
| CAM.5 | 204.9 | 95.8 | 3.8 |
| CAM.6 | 201.8 | 90.2 | 4.5 |
| CAM.7 | 211.2 | 41.3 | 19.2 |
| CAM.8 | 210.0 | 67.8 | 8.9 |

The invention claimed is:

1. A process for manufacturing a coated cathode active material, the process comprising the steps of
 (a) providing a particulate electrode active material according to general formula $Li_{1+x}TM_{1-x}O_2$, wherein TM is Ni and, optionally, at least one of Co and Mn, and, optionally, at least one element selected from the group consisting of Al, Mg, Ba, and transition metals other than Ni, Co, and Mn, and x is in a range of from zero to 0.2, wherein at least 50 mole-% of the transition metal of TM is Ni,
 (b) treating said particulate electrode active material with an aqueous medium that may include a heteropoly acid or a compound of Al or Sb,
 (c) removing the water from step (b) at least partially,
 (d) adding at least one heteropoly acid or its respective ammonium or lithium salt or a compound of Al or Sb, as particulate compound or as aqueous solution or slurry,
 (e) treating the mixture from step (d) thermally,
 (f) adding at least one compound selected from the group consisting of $B_2O_3$, boric acid and lithium borates to the solid material obtained from step (e), if applicable, or from step (d) or (c), respectively, thereby depositing B on a surface of said particulate electrode active material, and (g) treating the residue obtained from step (f) thermally, wherein the aqueous medium in step (b) includes a heteropoly acid or a compound of Al or Sb, or both.

2. The process according to claim 1, wherein TM is a combination of metals according to general formula (I)

$$(Ni_aCo_bMn_c)_{1-d}M_d \quad (I)$$

with
 a being in a range of from 0.6 to 0.99,
 b being zero or in a range of from 0.01 to 0.2,
 c being in a range of from zero to 0.2, and
 d being in a range of from zero to 0.1,
 M is at least one of Al, Mg, Ti, Mo, W and Zr, and
 a+b+c=1.

3. The process according to claim 1, the compound of Al or Sb added in step (d) is selected from the group consisting of $Al_2O_3$, $Al_2(SO_4)_3$, and $Sb_2O_3$.

4. The process according to claim 1, the heteropoly acid is selected from the group consisting of phosphotungstic acid, phosphomolybdic acid, tungstosilicic acid, molybdosilicic acid, and their respective ammonium and lithium salts.

5. The process according to claim 1, wherein step (g) includes a calcination step at a maximum temperature in a range of from 300 to 700° C.

6. The process according to claim 1, wherein step (g) includes a drying step at a maximum temperature in a range of from 40 to 250° C.

7. The process according to claim 1, in step (d) an aqueous solution or slurry of compound(s) of Al or Sb or of heteropoly acid is added.

* * * * *